(12) United States Patent
Silk et al.

(10) Patent No.: US 8,129,659 B2
(45) Date of Patent: Mar. 6, 2012

(54) APPARATUS HAVING DC ARC START IN PARALLEL WITH WELDER POWER SUPPLY

(75) Inventors: Kevin C. Silk, Stow, OH (US); Richard A. Ales, Solon, OH (US)

(73) Assignee: Swagelok Company, Solon, OH (US)

( * ) Notice: Subject to any disclaimer, the term of this patent is extended or adjusted under 35 U.S.C. 154(b) by 186 days.

(21) Appl. No.: 12/445,588

(22) PCT Filed: Oct. 19, 2007

(86) PCT No.: PCT/US2007/081887
§ 371 (c)(1),
(2), (4) Date: Apr. 15, 2009

(87) PCT Pub. No.: WO2008/051820
PCT Pub. Date: May 2, 2008

(65) Prior Publication Data
US 2010/0276406 A1    Nov. 4, 2010

Related U.S. Application Data

(60) Provisional application No. 60/862,232, filed on Oct. 20, 2006.

(51) Int. Cl.
*B23K 9/10* (2006.01)
*B23K 9/12* (2006.01)
(52) U.S. Cl. ..................... 219/133; 219/130.1
(58) Field of Classification Search ............... 219/130.1, 219/130.31, 130.4, 133
See application file for complete search history.

(56) References Cited

U.S. PATENT DOCUMENTS

| | | | |
|---|---|---|---|
| 3,571,558 A * | 3/1971 | Hogan, Jr. .................. | 219/130.4 |
| 4,123,646 A * | 10/1978 | Keinanen .................. | 219/137 R |
| 4,672,175 A * | 6/1987 | Niven ......................... | 219/130.4 |
| 4,896,812 A * | 1/1990 | Kazlauskas ..................... | 228/32 |
| 4,950,864 A | 8/1990 | Campiotti et al. | |
| 5,582,751 A * | 12/1996 | Hagiwara et al. .......... | 219/130.1 |
| 5,601,741 A | 2/1997 | Thommes | |
| 5,852,278 A * | 12/1998 | Tanaka et al. .............. | 219/130.4 |
| 6,075,224 A * | 6/2000 | De Coster .................. | 219/130.4 |
| 6,156,999 A | 12/2000 | Ignatchenko et al. | |
| 6,329,636 B1 | 12/2001 | Geissler | |
| 6,815,639 B2 | 11/2004 | Geissler | |
| 6,987,242 B2 | 1/2006 | Geissler | |
| 7,235,759 B2 | 6/2007 | Geissler | |
| 2006/0138112 A1 | 6/2006 | Geissler | |

FOREIGN PATENT DOCUMENTS

| | | | |
|---|---|---|---|
| GB | 2095489 A | * | 9/1982 |
| JP | 57019156 A | * | 2/1982 |
| JP | 57193275 A | * | 11/1982 |

OTHER PUBLICATIONS

International Search Report and Written Opinion from PCT/US07/081887 dated Apr. 18, 2008.

* cited by examiner

*Primary Examiner* — Sang Paik
(74) *Attorney, Agent, or Firm* — Calfee, Halter & Griswold LLP

(57) ABSTRACT

A DC arc start function for a welder. The arc start function is realized using a universal input DC regulator coupled to a DC to DC converter that produces a regulated DC voltage that is sufficient to strike an arc at an electrode of the welder.

7 Claims, 3 Drawing Sheets

APPARATUS HAVING DC ARC START IN PARALLEL WITH WELDER POWER SUPPLY

RELATED APPLICATIONS

The present application is the U.S. national phase entry of PCT/US2007/081887, with an international filing date of Oct. 19, 2007, which claims the benefit of U.S. provisional application Ser. No. 60/862,232 filed on Oct. 20, 2006, for DC ARC START WITH UNIVERSAL INPUT, the entire disclosures of which are fully incorporated herein by reference in their entirety.

BACKGROUND

In arc welding, such as for example an orbital welder, a welder power supply is used that produces a low voltage high current power source to maintain a stable arc. The arc is initiated or struck by a high voltage breakdown across the gap between the electrode and the workpiece. Once the arc is struck, the voltage across the gap is much lower than the breakdown voltage and the current increases substantially. An arc start circuit may be used to strike the arc, and then the welder power supply is used during the welding operation.

Arc start circuits are generally either AC or DC. The present disclosure is directed to a DC arc start circuit. Known DC arc start circuits are designed for particular input voltage specifications. If the input voltage changes, a new model power supply with the appropriate input range must be selected to operate using the new input voltage, otherwise an incorrect output voltage is produced, or in some cases the DC arc start circuit can only work with a single input voltage.

Summary

In accordance with one inventive aspect of the disclosure, a DC arc start circuit is contemplated that is autoranging. As used in this disclosure, autoranging refers to a circuit performance that produces a stable and repeatable output over a wide range of input voltage. The arc start circuit operates effectively as a universal input power supply. In one embodiment, a DC arc start circuit includes an autoranging or universal input DC power supply that converts an AC or DC input source to a first DC voltage. The DC arc start circuit further includes a DC to DC converter that receives the first DC voltage and increases it to a second DC voltage of a value that is sufficient to reliably start or strike an arc. Other inventive aspects of the disclosure include a welding system that uses an autoranging DC arc start circuit, as well as methods for producing an arc start voltage with a universal input supply.

These and other aspects and advantages of the disclosure and inventions herein will be readily understood and appreciated from a reading of the following detailed description in view of the accompanying drawings.

DETAILED DESCRIPTION OF EXEMPLARY EMBODIMENTS

Figure 1:
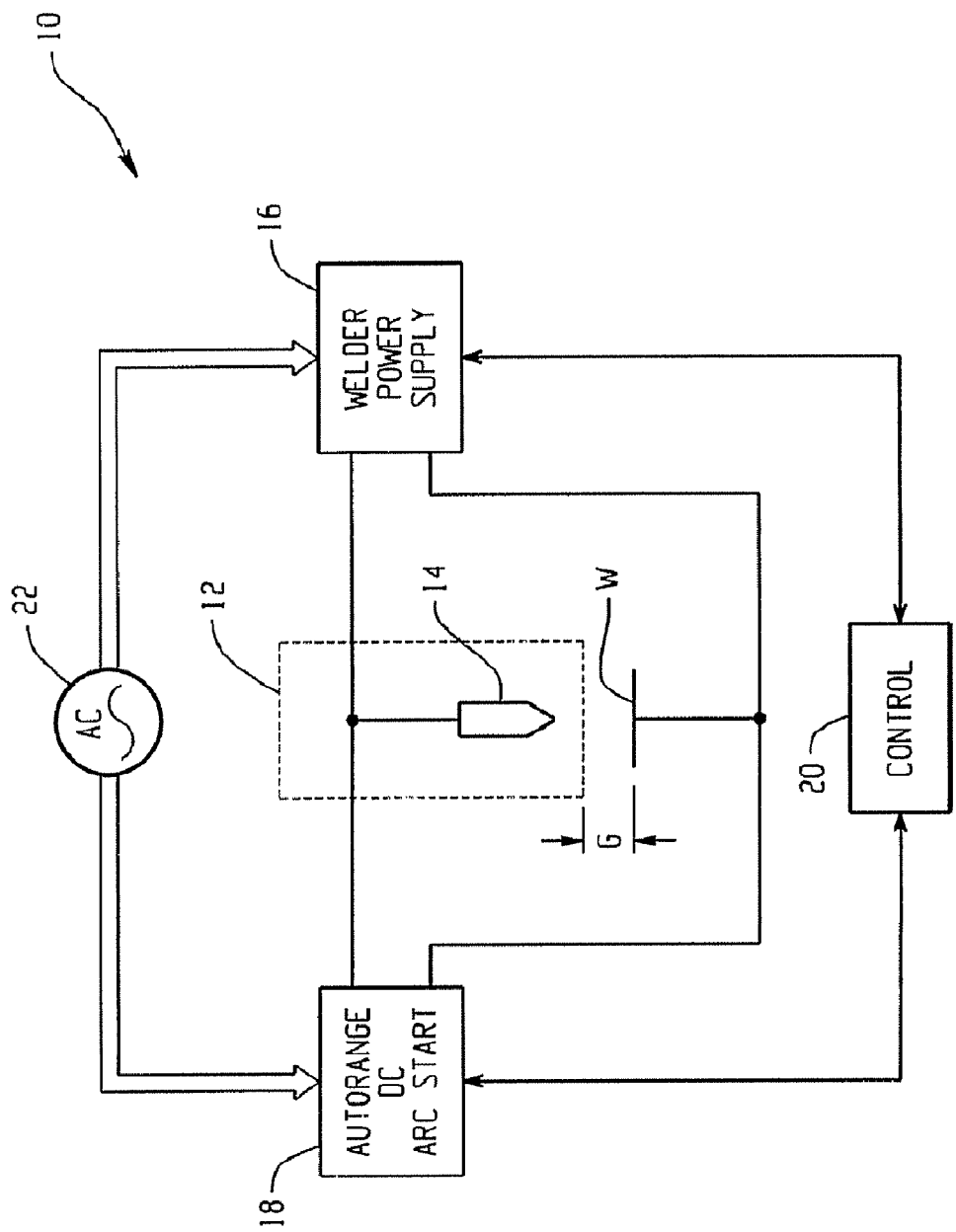
FIG. 1 is a simplified functional block diagram of a welding system incorporating the present disclosure.

With reference to FIG. 1, a welding system 10 is schematically represented, and in this exemplary embodiment includes a weld head 12 having an electrode 14. The inventive aspects that are part of this disclosure may be used with many kinds of weld heads or welding devices, for example, a weld head SWS-5H-C available from Swagelok Company, Cleveland, Ohio. The weld head 12 may be manual or automatic and typically includes or is associated with a fixture (not shown) that holds or positions a workpiece W near the electrode 14 for a welding operation. For example, an orbital welder may include a weld head that holds the electrode (and motor to rotate the electrode) and interfaces with a fixture or holder that supports two tube ends. The tube ends are typically clamped in end to end abutting engagement with the abutting ends proximate the electrode 14 for welding. But the present inventions are not limited to any particular welder power supply, welding system or welding technology or workpiece characteristics.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the scope of the inventions instead being set forth in the appended claims or the claims of related or continuing applications. Descriptions of exemplary methods or processes are not limited to inclusion of all steps as being required in all cases, nor is the order that the steps are presented to be construed as required or necessary unless expressly so stated.

The welding system 10 further includes a welder power supply 16, for example, model SWS-M100-1-1 available from Swagelok Company, Cleveland, Ohio. The power supply 16 provides the appropriate voltage and current profiles to carry out each welding operation. The welder power supply 16 typically provides the power needed after the weld arc is struck. The welding system 10 also includes an arc start circuit 18. The arc start circuit 18 is represented as physically embodied separate from the welder power supply 16, but in practice may be incorporated therewith, and all may be incorporated with the control 20. The control 20 carries out overall control of a welding operating including control of the arc start circuit 18, the power supply 16, drive motor of the weld head, purge control and so on. An exemplary control 20 may be model M100 available from Swagelok Company, Cleveland, Ohio. Functionally, the arc start circuit 18 provides high voltage, low current power, such as a pulse, that breaks down or ionizes the gap G between the electrode 14 and the workpiece W. Once the arc is struck, the arc start circuit 18 may be disabled or otherwise functionally removed from the system operation, and the power supply 16 may be used to provide low voltage, high current power to maintain the arc during a welding operation. Thus electrically, the arc start circuit 18 and the power supply 16 may be in parallel across the gap G.

A general power source 22, such as commercial AC wall power, may be used to power the arc start circuit 18 and the power supply 16. Some welding systems 10 may include a portable supply or generator for the source 22. Thus the supply 22 may be conventional 110 VAC, 220 VAC or other power input sufficient to power the system 10. The system 10 may also operate from a DC source. In particular, the DC arc start circuit 18 may alternatively operate from a DC source 22.

In accordance with one inventive aspect, a DC arc start circuit 18 is provided that is autoranging or in other words operates with a universal input, meaning that the circuit 18 may be plugged into or connected to any source 22 that has enough power for the system 10, whether the source 22 is 110 VAC, 220 VAC, or other voltage. The input range is only limited by the specification of the autoranging AC to DC voltage regulator (FIG. 2), but typically will be able to accept standard wall power and power from most portable generators, and power supplied from different regions that may have varying specifications. In other words, universal input may also be thought of in terms of an unregulated wide range on the input to the arc start circuit 18, with the input being comparatively unregulated (although provided within a broad specification) relative to a regulator output as described below. Thus, by unregulated we mean that the input voltage (such as from a wall supply) can only be known within a fairly broad range, and the actual value can change from outlet to outlet, region to region and so on. In contrast, the DC arc start circuit in accordance with the present disclosure will produce a repeatable regulated output DC voltage to strike an arc regardless of such unregulated input.

Figure 2:
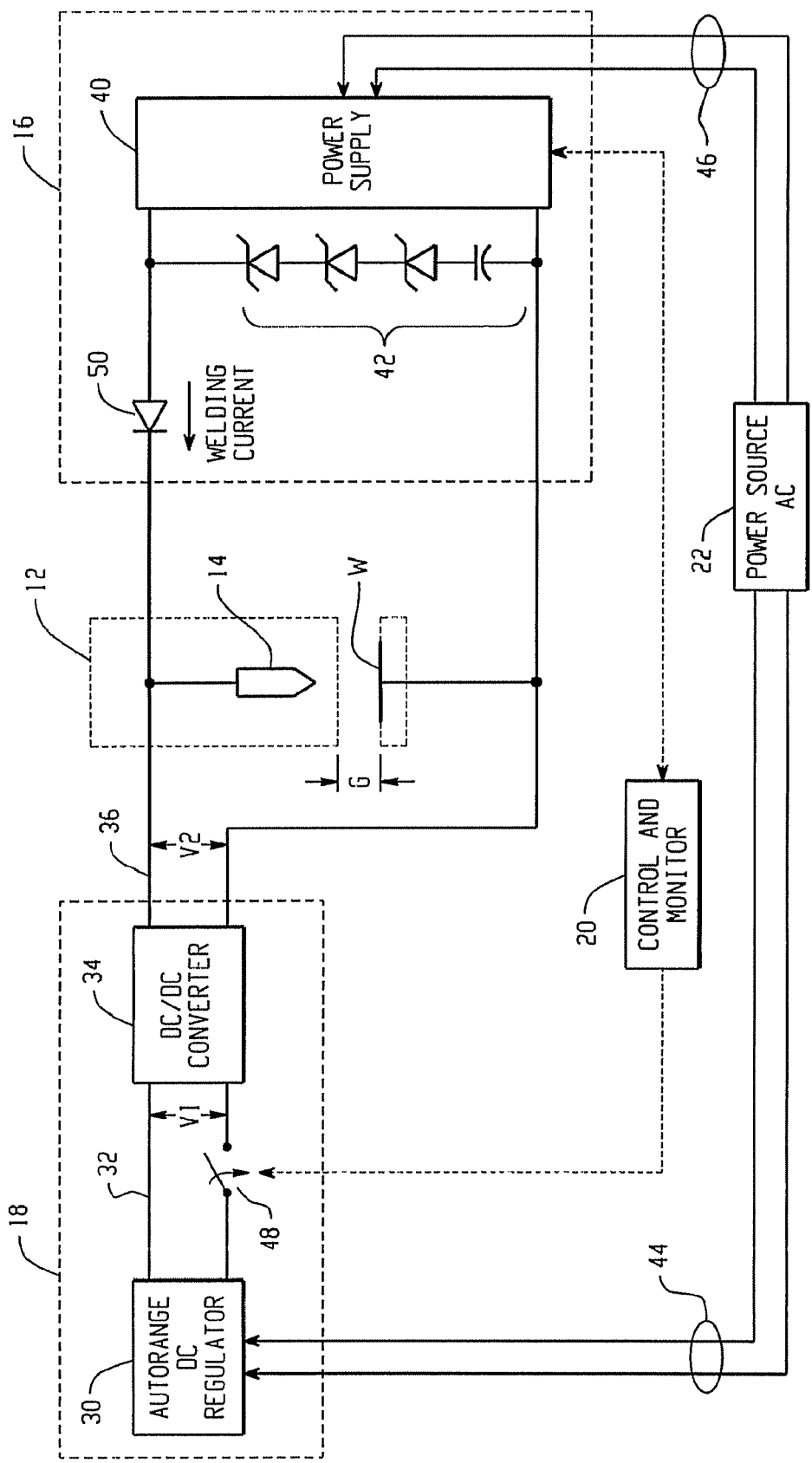
FIG. 2 is a more detailed functional block diagram of a DC arc start circuit used in a welding system.

With reference to FIG. 2, an exemplary embodiment of the system 10 is illustrated. In this embodiment, the autoranging DC arc start circuit 18 may be realized using an autoranging or universal input DC regulator 30. An exemplary circuit is an LPQ170 Series, available from ASTEC, Carlsbad, Calif. The circuit 18 may alternatively be realized with other commercial autorange regulators or a custom designed circuit. The exemplary ASTEC circuit accepts a comparatively unregulated input voltage range of 85-264 VAC and 47-63 Hz or 120-300 VDC and produces a highly regulated DC output 32. The output voltage 32 (V1) is selected based on the input voltage V1 needed to a DC to DC converter 34 to produce the desired high voltage (V2) output 36 to reliably and repeatedly strike an arc across the gap G. In the exemplary embodiment, the voltage V1 may be 12 VDC and the voltage V2 may be, for example, about 1800 VDC but this value will depend on the type of electrode, purge gas, gap distance, workpiece material and so on. For the exemplary regulator 30, for example, the output voltage may typically be regulated to within 5% of nominal.

The converter 34 may be realized for example using a DC to HVDC (high voltage DC) converter, G series available from EMCO High Voltage Corporation, Sutter Creek, Calif. The converter 34 may alternatively be realized using other DC to DC converters that are commercially available or a custom circuit if required. The EMCO G30 converter 34 produces a stable DC output 36 (V2) in response to the DC input V1. Thus, the combination of a universal output DC regulator 30 with a DC to DC converter 34 may be used to provide a reliable and repeatable DC voltage V2 to strike an arc, with a universal input or autoranging function.

As shown in FIG. 2, the welder power supply 16 may be conventional in design, such as including an inverter 40, or a custom circuit may be used. A diode capacitor circuit 42 may be used, as is known, to provide a sustaining voltage and current for the arc after the arc has been struck and before the main power supply 16 takes over to supply low voltage high current for the arc during a welding operation. Power lines 44 connect the source 22 to the arc start circuit 18 and power lines 46 connect the source 22 to the power supply 16.

The arc start circuit 18 may further include a switch or control function 48. This switch may be for example a solid state switch, a relay or other suitable control device. The control function 48 may be actuated by the control system 20, and in an alternative embodiment may be incorporated into the control circuit 20. When the switch is closed or activated, the DC arc start circuit is complete and the output voltage V2 is impressed across the gap G. As soon as the arc is struck the switch 48 may be opened so as to provide welding current from the power supply 16 and to disable or disconnect the arc start circuit 18. A diode 50 or other suitable isolation device may be used to protect the power supply 16 from the high DC voltage output of the arc start circuit. The configuration of the circuit of FIGS. 1 and 2 may be varied as needed. For example, in another embodiment, the universal input regulator 30 may be part of the control circuit 20, with the AC input 22 being coupled to the control circuit 20, so that the control circuit 20 outputs a lower voltage DC signal 32 that is input to the DC to DC converter 34. Many other configurations may be used.

Figure 3:
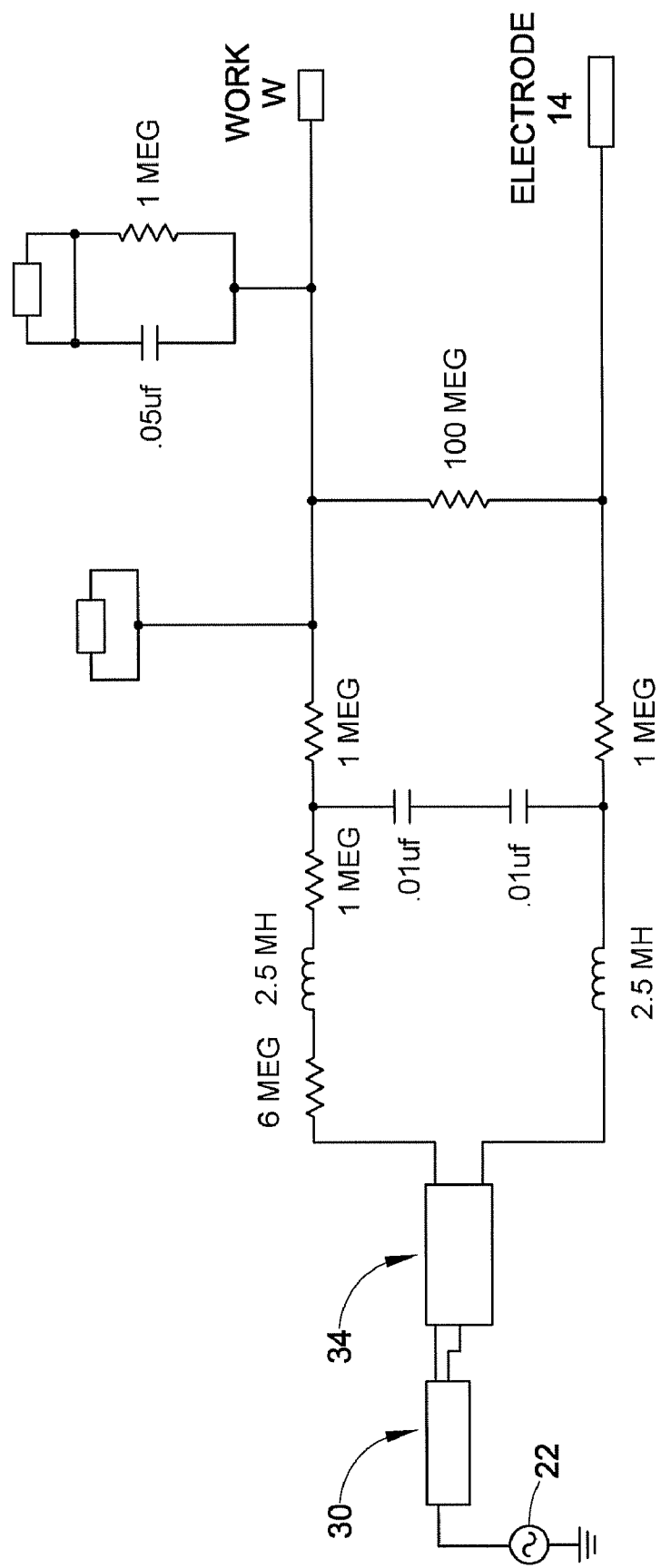
FIG. 3 is an electrical schematic of a DC arc start circuit embodiment.

FIG. 3 illustrates and exemplary schematic diagram of a DC arc start circuit in accordance with the disclosure herein, with various components that correspond to the elements of FIGS. 1 and 2 indicated with like reference numerals.

We claim:

1. Electrical power apparatus for an orbital welder, comprising:
   a welder power supply for providing electrical energy for welding after a welding arc has been struck, said welder power supply having an input that is connectable to a power source,
   a DC arc start circuit comprising a universal input DC regulator that produces a regulated DC output voltage V1, said DC regulator comprising an input connectable to said power source,
   a DC to DC converter that produces a DC output voltage V2 in response to an input that receives said regulated DC output voltage V1, said regulated DC output voltage V1 being insufficient to strike a welding arc and said DC output voltage V2 being sufficient to strike a welding arc,
   said DC arc start circuit being connectable to said power source in parallel with said welder power supply.

2. The electrical power apparatus of claim 1 wherein said power source provides a voltage in the range of about 85-264 VAC or 120-300 VDC.

3. The electrical power apparatus of claim 1 in combination with an orbital welder comprising a welder electrode, wherein said output voltage V2 is coupled to said welder electrode in parallel with an output from said welder power supply.

4. The electrical power apparatus of claim 1 comprising an isolation device that protects said welder power supply from said DC output voltage V2.

5. The electrical power apparatus of claim 1 wherein said power source comprises commercial wall power.

6. The electrical power apparatus of claim 1 wherein said power source comprises an output from a portable AC generator.

7. The electrical power apparatus of claim 1 comprising an electronic switch that operates to disable said DC arc start circuit after an arc is struck.

* * * * *